United States Patent [19]

Carlson

[11] Patent Number: 4,562,472

[45] Date of Patent: Dec. 31, 1985

[54] DOUBLE CONVERSION TUNER WITH SPLIT IF OUTPUT

[75] Inventor: David J. Carlson, Indianapolis, Ind.

[73] Assignee: RCA Corporation, Princeton, N.J.

[21] Appl. No.: 556,447

[22] Filed: Nov. 30, 1983

[51] Int. Cl.[4] .......................... H04N 5/62; H04B 1/16; H04B 1/26

[52] U.S. Cl. .................................... 358/197; 455/207; 455/315

[58] Field of Search ...................... 358/197, 198, 191.1, 358/144; 455/315, 207; 381/2, 3, 4, 15

[56] References Cited

U.S. PATENT DOCUMENTS 2,591,264  4/1952  Janssen .................................. 178/5.8
3,696,302  10/1972  Gossard ............................... 325/432

OTHER PUBLICATIONS

"Intercarrier Buzz Phenomena Analysis and Cures", by P. Fockens and C. G. Eilers, IEEE Transactions on Consumer Electronics, vol. CE-27, No. 3, Aug. 1981.

Primary Examiner—James J. Groody
Assistant Examiner—Howard L. Carter
Attorney, Agent, or Firm—Paul J. Rasmussen; Peter M. Emanuel; Henry I. Steckler

[57] ABSTRACT

A double conversion television tuner has first and second mixers and uses both the sum and difference frequency signals from the second mixer. The picture component of the difference frequency is separated from the output of the second mixer using a first filter and then demodulated. A second filter passes the sum frequency signal and the second harmonic of the nominally fixed frequency local oscillator signal applied to the second mixer. A third mixer is coupled to the second filter and mixes the converted sum frequency signal with the second harmonic signal. The audio component of the resulting sound signal is demodulated. Because the sum and difference signals at the output of the second mixer are far apart in frequency, the first and second filters can be easily designed so as not to interact.

20 Claims, 1 Drawing Figure

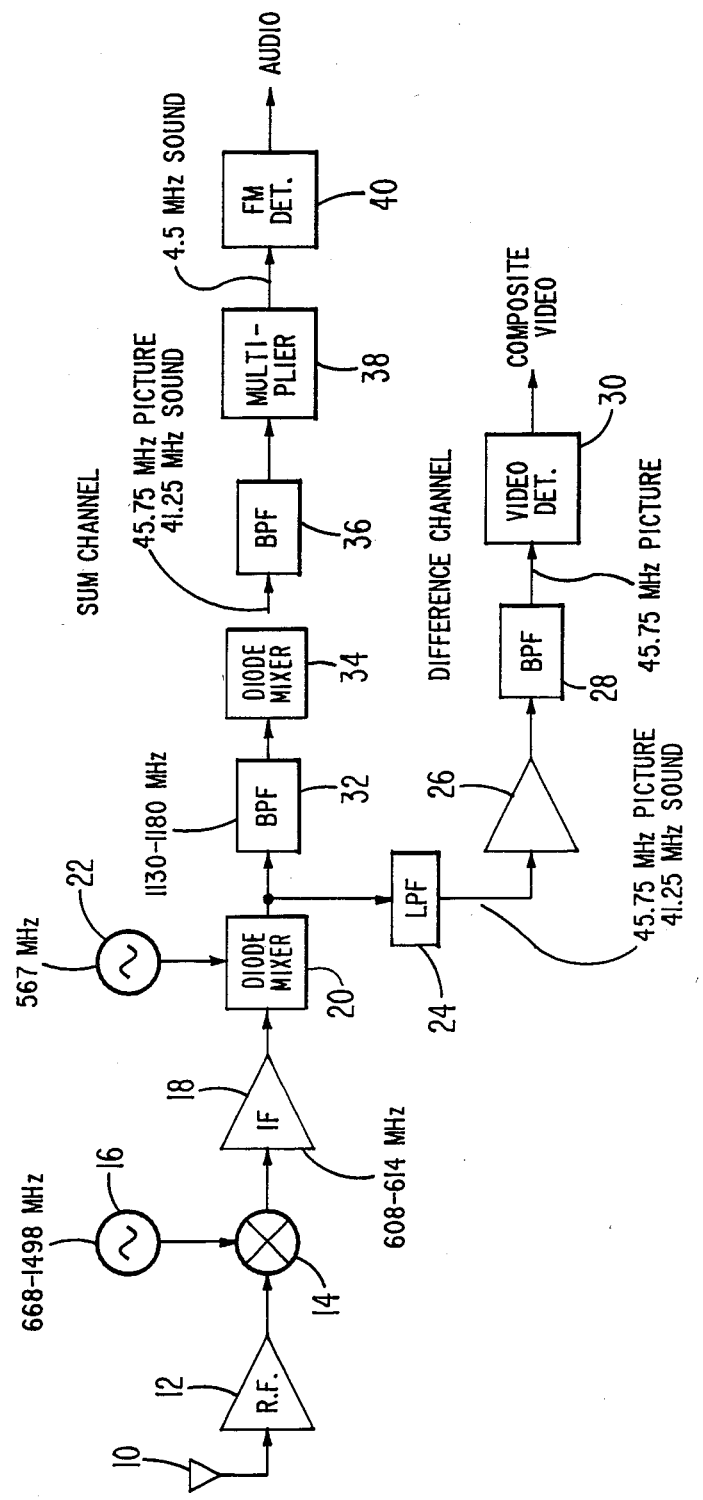

DOUBLE CONVERSION TUNER WITH SPLIT IF OUTPUT

BACKGROUND OF THE INVENTION

The present invention relates to double conversion television tuners, and more particularly, to such tuners that have split IF (intermediate frequency) outputs.

The conventional television receiver is of the "intercarrier" type, wherein both the amplitude modulated (AM) picture and frequency modulated (FM) sound carriers are amplified in a common IF amplifier. A video detector provides an output signal comprising a composite video signal and an intercarrier sound signal. The intercarrier sound signal is then applied to an FM detector to provide a baseband sound signal. In the intercarrier system, due to the mixing of the AM picture carrier and the FM sound carrier to obtain the intercarrier sound signal, the amplitude modulation of the picture signal may cause a buzz at the horizontal frequency and harmonics thereof. However, for monophonic sound, which has an upper cut-off frequency less than the horizontal frequency, this buzz may not be of sufficient strength to be annoying.

Recently, interest has been shown in adding stereophonic sound to television receivers. It has been found with the intercarrier system that the amplitude modulation of the picture signal causes a buzz in the audio signal that is annoying due to the wider bandwidth of the stereophonic signal compared to that of the monophonic signal. To overcome this problem, an IF system called "quasi-parallel" or "quasi-split sound" has been proposed as shown in FIG. 7 of the article entitled "Intercarrier Buzz Phenomena Analysis and Cures" by P. Fockens and C. G. Eilers, IEEE Transactions on Consumer Electronics, Vol. CE-27, No. 3. In the quasi-parallel system, the video signal is applied to one IF channel for amplification and detection, while both the video and sound signals are applied to another channel in order to form the intercarrier signal. Filters are used at the input of the channels to select the desired signals. These filters have their inputs coupled together and to the output of the tuner mixer. Further, if the filters are of the SAW (surface acoustic wave) type, they may even share a common launch electrode. This may lead to interaction between the filters, thereby causing undesired peaks and nulls in the frequency response of the filters.

It is therefore desirable to have a television IF system without the above problems.

SUMMARY OF THE INVENTION

In accordance with a principle of the invention, both sum and difference frequency products of a mixer having a fixed tuned oscillator coupled to it are used in separate channels, e.g., to provide separate video and audio detection. The frequencies of these channels are so different that filters at their inputs do not interact. According to another aspect, in a further mixer in one of the channels, a harmonic of the oscillator is used to convert the signal in the this channel to a lower frequency. Since the oscillator, and therefore the products of the mixer have fixed frequencies, signals in the channels can be filtered by fixed tuned filters. It is recognized herein that a double conversion tuner in which the second mixer has nominally fixed tuned local oscillator coupled to it, provides a unique oportunity for embodying this invention.

DESCRIPTION OF THE DRAWING

The sole FIGURE is a block diagram of a double conversion tuner which is the preferred embodiment of this invention.

DETAILED DESCRIPTION

In the FIGURE, an antenna 10 supplies conventional broadcast television signals of channels 2 to 83 to RF (radio frequency) amplifier stage 12. As known in the art, stage 12 has tuned circuits (not shown) located at the input and output of the amplifying device therein tuned to the channel to be received. The output signal from stage 12 is applied to a first mixer 14 preferably of the doubly balanced type so as to minimize spurious output signals. Local oscillator 16 provides a first local oscillator signal having a frequency range of 668 to 1498 MHz for channels 2 to 83 respectively, which is also applied to mixer 14. It will be appreciated that a practical embodiment of oscillator 16 could include a frequency synthesizer such as a phase locked loop as a control element whereby the frequency of local oscillator 16 is set according to the particular channel selected. First mixer 14 provides at its output a first IF signal having a frequency range that is determined by the difference between the frequency of the first local oscillator signal from oscillator 16 and the frequency range of the selected RF signal. Thus the first IF signal has a frequency range of 608 to 614 MHz with a 612.75 MHz picture carrier frequency and 608.25 MHz sound carrier frequency. The frequency range of the first IF signal corresponds to channel 37, which is not being used for television broadcast due to considerations of radio astronomy. The advantages of this frequency range are described in detail in U.S. patent application No. 508,595, filed June 28, 1983 and under common assignment herewith. If desired, two separate tuners (RF stage, mixer, and local oscillator) can be used, one for the VHF and cable channels, the other for the UHF channels.

The first IF signal is applied to first IF amplifier 18 including a band pass filter and from amplifier 18 to second mixer 20. Second local oscillator 22 supplies a second local oscillator signal having a nominal fixed frequency of 567 MHz to second mixer 20. Generated at the output of second mixer 20 are a difference frequency signal including the conventional 41.25 MHz sound carrier and 45.75 MHz picture carrier and sum frequency signal including a 1179.75 MHz picture carrier and a 1175.25 MHz sound carrier. In addition, for the reasons stated below, it is desirable that a second harmonic signal (1134 MHz) of second local oscillator 22 be present at the output of second mixer 20. Second mixer 20 is preferably a simple diode type so that the second harmonic of the second local oscillator signal is present at the output of mixer 20 at a significant amplitude due to the non-linearity and unbalanced output configuration of the mixer. To further increase the amplitude of the second harmonic signal, a diode frequency multiplier can be used between oscillator 22 and mixer 20. Alternatively, a separate oscillator coupled to mixer 20 and providing a signal having a frequency of 1134 MHz can be used.

The output signal from second mixer 20 is applied to LPF (low pass filter) 24, having a cutoff frequency of about 100 MHz, and then to amplifier 26. The output signal from amplifier 26 is applied to BPF (band pass filter) 28, which can be of the SAW (surface acoustic wave) type. This filter is designed the pass to video and chrominance carriers and their associate sideband and to attenuate the sound carrier at 41.25 MHz. The resulting video signal is applied to a conventional synchronous detector 30. Detector 30 uses a 45.75 MHz signal as a reference signal and supplies at its output a composite video signal with baseband luminance and color signals. This composite signal is then applied to other circuits (not shown) for conventional processing and display.

The output of mixer 20 is also applied to BPF 32 having a passband of from 1130 to 1180 MHz. It will be appreciated that the passband of BPF 32 is so far removed from that of LPF 24 that these filters can be designed so that there is no mutual interaction. BPF 32 passes the second harmonic signal of second local oscillator 22 (1134 MHz), and the sum input signals of mixer 20 including 1179.75 MHz picture carrier and a 1175.25 MHz sound carrier. These signals are applied to a third mixer 34, preferrably a simple diode type mixer wherein difference frequency signals between the 1179.75 MHz picture carrier and the 1134 MHz second harmonic and the 1175.25 MHz sound carrier and the 1134 MHz second harmonic are generated. Thus, a 45.75 MHz picture carrier and a 41.25 MHz sound carrier (i.e., 1179.75−1134=45.75 and 1175.25−1134=41.25) are produced at the output of third mixer 34. These difference signals are applied to BPF 36, which can be a SAW filter, having a double peaked response at 45.75 MHz and 41.25 MHz. The output of BPF 36 is applied to a multiplier 38, which mixes the 45.75 MHz picture carrier and the 41.25 MHz sound carrier to produce a 4.5 MHz intercarrier FM sound signal. This signal is then applied to FM detector 40, which provides a baseband audio signal.

It will be appreciated that in a single conversion tuner the local oscillator frequency is variable in order to perform channel selection. This means that if the difference frequency mixer output signal is selected to be the fixed frequency IF signal, the sum frequency mixer output signal has a variable frequency. Thus, if the sum frequency mixer output signal of a single conversion tuner is used to provide an IF signal in addition to that provided by the difference frequency mixer output IF signal, the BPFs in the sum frequency channel, e.g., BPFs 32 and 36, would need to have a variable center frequency with a large range. This is impractical. A double conversion tuner, as disclosed above, has fixed sum and difference frequencies at the output of the second mixer, e.g., mixer 20, since the second oscillator, e.g., oscillator 22, has a nominally fixed frequency. This allows the BPFs to be fixed tuned.

It will be further appreciated that the second channel of the invention (elements 32–40) can be used for purposes other than demodulating television audio. For example, in some cable and proposed satellite systems in which picture information is transmitted in scrambled form, an unscrambling signal is transmitted on the sound carrier in amplitude modulated form. In this case, BPF 36 can be designed to pass only the sound carrier and detector 38 would be a simple envelope detector (detector 40 is not needed). The television sound would then be detected in the lower channel (elements 24–30) using conventional techniques. BPF 28 would then have to pass the sound signal and detector 30 could be a synchronous detector followed by an FM detector.

It will be still further appreciated, that the harmonic signal and mixer 34 can be eliminated. In this case, multiplier 38 will beat the 1175.25 MHz sound carrier with the 1179.75 MHz picture carrier to produce a 4.5 MHz intercarrier sound signal, which in turn is demodulated by demodulator 40. However, in order to provide an intercarrier beat frequency signal of sufficient amplitude for proper operation of multiplier 38, amplification of the 1179.75 and 1175.25 MHz frequency signals would be required, which amplification is expensive in this frequency range.

It will be noted that oscillator 22 can have an AFT (automatic fine tuning) signal applied thereto. In this case, its frequency will be shifted by e.g., ±250 kHz. Since this shift is small relative to the center frequency of oscillator 22, its frequency is "nominally fixed". Thus the invention will still work even with AFT.

What is claimed is:

1. Apparatus comprising:
   input means for receiving a television signal having audio and picture components at different frequencies;
   a tunable first local oscillator;
   a first mixer coupled to said input means and said first local oscillator and having an output providing a first intermediate frequency signal;
   a nominally fixed frequency second local oscillator;
   a second mixer coupled to said second local oscillator and said first mixer output and having an output providing a second intermediate frequency signal and a second harmonic of the second local oscillator, said second intermediate frequency signal having both sum and difference frequency components of said first intermediate frequency signal and said nominally fixed frequency second local oscillator;
   first and second filters coupled to said second mixer for respectively passing said sum and difference frequencies, said first filter also passing said harmonic;
   means for detecting said picture component coupled to said second filter;
   a third mixer coupled to said first filter for mixing said harmonic and said sum components and providing a signal having components with frequencies equal to the differences between each of said sum frequency components and the frequency of said harmonic respectively; and
   means for detecting said audio component coupled to said third mixer.

2. Apparatus as claimed in claim 1, wherein said input means comprises a radio frequency processing stage and said first local oscillator is tunable according to a selected one of a plurality of channels.

3. Apparatus as claimed in claim 1, wherein said tunable oscillator tunes a range including 668 to 1498 MHz, said first intermediate frequency range is substantially between 608 to 614 MHz, and said fixed oscillator provides a signal nominally at 567 MHz.

4. Apparatus as claimed in claim 1, wherein said picture detecting means comprises a bandpass filter coupled to said second filter for passing said picture component and suppressing said audio component; and a synchronous detector coupled to said bandpass filter.

5. Apparatus as claimed in claim 1, wherein said first mixer comprises a doubly balanced mixer, and said second and third mixers each comprise respective diodes mixer.

6. Apparatus as claimed in claim 4, wherein said audio detecting means comprises a bandpass filter, coupled to said third mixer, for passing said audio and picture components; a multiplier coupled to said bandpass filter for providing an intercarrier sound signal; and an FM detector coupled to said synchronous detector for providing a baseband audio signal.

7. Apparatus comprising:
input means providing an input signal having two components at different first and second frequencies;
a local oscillator providing a signal at a nominal frequency;
a first mixer coupled to said local oscillator and said input means and having an output providing a first signal having components at frequencies equal to the differences between said first and second frequencies and said nominal frequency, respectively, a signal having components at frequencies equal to the sum of said first and second frequencies and said nominal frequency, respectively, and a harmonic of said selected frequency; and
a second mixer coupled to said first mixer and having an output providing a signal having components with frequencies equal to the differences between the frequencies of each of said sum frequency components and said harmonic signal, respectively.

8. Apparatus as claimed in claim 7, wherein said input signal comprises a television signal and said two components comprise audio and picture signals.

9. Apparatus as claimed in claim 7, further comprising a bandpass filter coupled between said first and second mixers for passing said sum frequency components and said harmonic signal.

10. Apparatus as claimed in claim 7, further comprising means, coupled to said second mixer, for detecting information modulated on to at least one of said components.

11. Apparatus as claimed in claim 7, further comprising a low pass filter coupled to said first mixer for passing said difference frequency components.

12. Apparatus comprising:
input means for receiving an input signal having at least a first frequency component;
a local oscillator having a nominally fixed second frequency;
a first mixer coupled to said input means and said local oscillator and having an output providing at least a signal having a third frequency equal to the sum of said first and second frequencies and also providing a harmonic signal of said second frequency;
a second mixer coupled to said first mixer and having an output providing a signal having a frequency of the difference between said third frequency and said harmonic frequency.

13. Apparatus as claimed in claim 12, wherein said input signal comprises a television signal and said component comprises a modulated audio carrier.

14. Apparatus as claimed in claim 13, further comprising means, coupled to said second mixer, for demodulating said audio carrier.

15. Apparatus as claimed in claim 12, wherein said harmonic comprises a second harmonic.

16. Apparatus as claimed in claim 12, wherein said first mixer comprises a diode mixer.

17. Apparatus comprising
input means for receiving a television signal having audio and picture components at different frequencies;
a tunable first local oscillator;
a first mixer coupled to said input means and said first local oscillator and having an output providing a first intermediate frequency signal;
a nominally fixed frequency second local oscillator;
a second mixer coupled to said second local oscillator and said first mixer output and having an output providing a second intermediate frequency signal having both sum and difference frequency components of said first intermediate frequency signal and said nominally fixed frequency signal;
first and second filters coupled to said second mixer for respectively passing said sum and difference components;
means for detecting said audio component coupled to one of said filters; and
means for detecting said picture component coupled to the remaining filter.

18. Apparatus as claimed in claim 17, wherein said audio detecting means is coupled to said first filter and said picture detecting means is coupled to said second filter.

19. Apparatus as claimed in claim 17, further comprising means, coupled to said second mixer, for providing a signal at the second harmonic of the frequency of said second local oscillator signal.

20. Apparatus as claimed in claim 19, further comprising a third mixer coupled to said first filter for mixing said harmonic and said sum components and providing a signal having components with frequencies equal to the differences between each of said sum frequency components and the frequency of said harmonic.

* * * * *